F. J. LAPOINTE.
FINISHING BROACH.
APPLICATION FILED JUNE 26, 1919.
1,339,657.
Patented May 11, 1920.
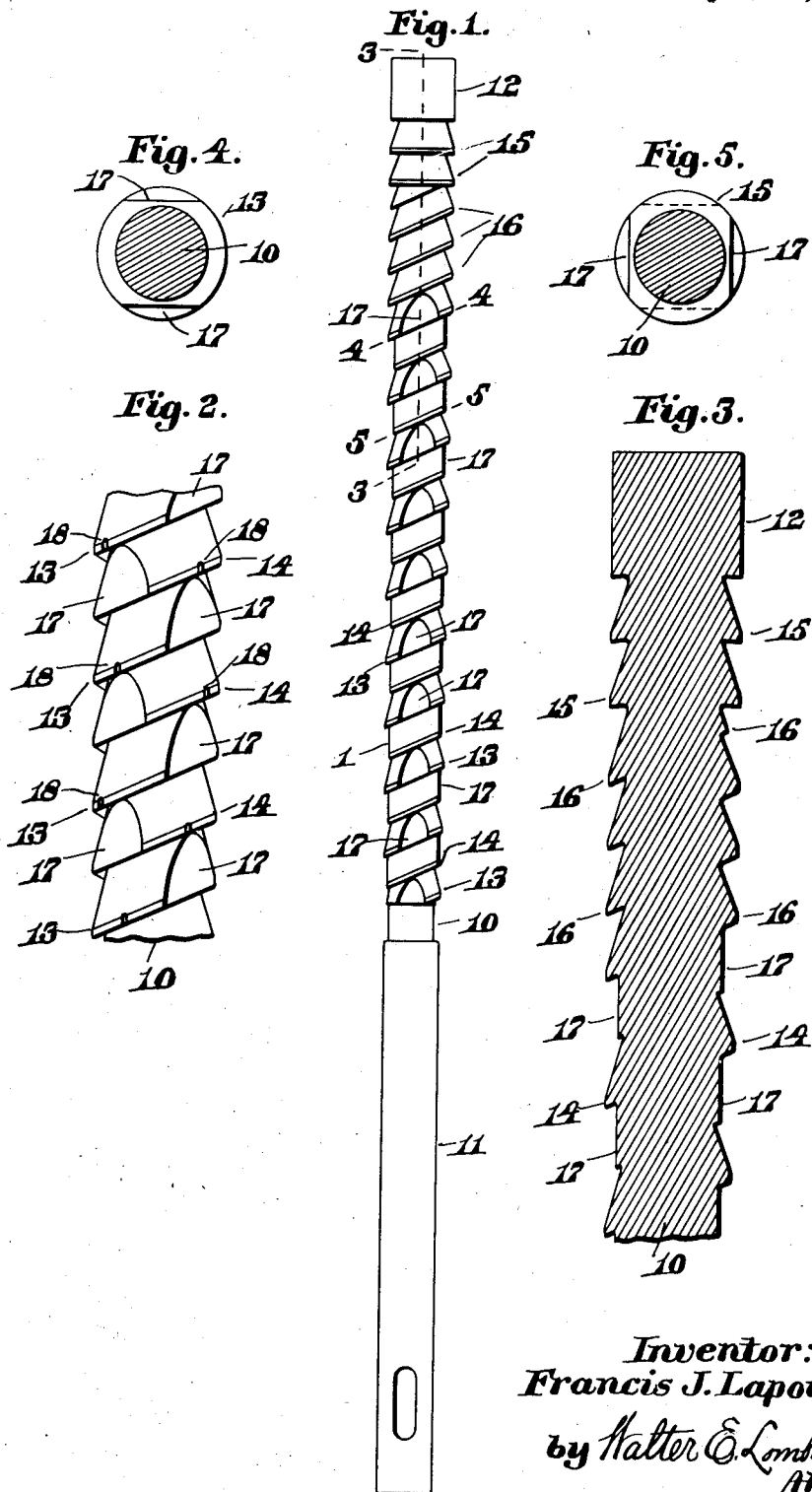
Inventor:
Francis J. Lapointe,
by Walter E. Lombard,
Atty.

UNITED STATES PATENT OFFICE.

FRANCIS J. LAPOINTE, OF ANN ARBOR, MICHIGAN.

FINISHING-BROACH.

1,339,657.

Specification of Letters Patent.  Patented May 11, 1920.

Application filed June 26, 1919. Serial No. 306,993.

*To all whom it may concern:*

Be it known that I, FRANCIS J. LAPOINTE, a citizen of the United States of America, and a resident of Ann Arbor, in the county of Washtenaw and State of Michigan, have invented certain new and useful Improvements in Finishing-Broaches, of which the following is a specification.

This invention relates to broaching tools and particularly to tools of this class designed to finish round holes.

The present invention has for its object the production of a finishing broach by which round holes of any length may be accurately finished leaving a burnished, unbroken surface.

The invention consists in certain novel features of construction and arrangement of parts which will be readily understood by reference to the description of the drawings and to the claims to be hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized and the invention is not limited to the precise arrangement and organization of these instrumentalities as herein shown and described except as required by the scope of the appended claims.

Of the drawings:

Figure 1 represents an elevation of a broaching tool embodying the principles of the present invention.

Fig. 2 represents an enlarged elevation of a portion of the same and showing the relative positions of the flattened portions of the cutting members.

Fig. 3 represents an enlarged section of the outer end of the tool.

Fig. 4 represents a transverse section on line 4, 4, on Fig. 1 drawn to an enlarged scale, and Fig. 5 represents a transverse section on line 5, 5, on Fig. 1 drawn to an enlarged scale.

Similar characters indicate like parts throughout the several figures of the drawings.

In the drawings, 10 is a member having a cylindrical portion 11 at one end and another cylindrical portion 12 at the opposite end.

The portion 12 is of larger diameter than the portion 11 and is adapted to burnish the hole when the broaching has been completed.

The member 10 has two helical cutting members 13, 14 extending from the cylindrical portion 11 toward the portion 12, the helices of said cutting members gradually increasing in diameter.

Between the portion 12 and the ends of the cutting members 13, 14, are a plurality of annular cutting members 15 having the same diameter as the portion 12.

The helices 16 of cutting members 13, 14 nearest to the annular members 15 are unbroken and continuous and are of the same diameter as the diameter of annular members 15 and burnishing member 12.

Between the helices 16 and the portion 11, the cutting members 13, 14, have flattened portions 17 disposed at intervals with the flattened portions 17 of one cutting member substantially perpendicular to the flattened surface 17 of the other member.

Preferably in each turn of each cutting member, there are two flattened surfaces 17 oppositely disposed. The flattened surfaces of the two cutting members are made of such a width that if in the same plane they would not intersect but would leave a short section of cutting member between the adjacent ends of said flattened surfaces.

The various flattened surfaces which are in substantial alinement have their ends in overlapping relation to each other to prevent any scratches being made in the work during the broaching operation. In other words the flattened surfaces in the same alinement have their ends out of alinement with each other said ends being at different distances from the center of the various flattened surfaces.

Each cutting member 13, 14, is also provided with a plurality of notches 18 which divide said members 13, 14, into a plurality of cutting sections.

Heretofore in tools of this class, it has been necessary to provide special designs for work of various lengths but with a tool constructed as herein described, work of any length may be successfully operated upon.

In the earlier tools a plurality of annular cutting members were used and consequently when short lengths of work were being operated upon, the work or broach would rock during the broaching operation and an imperfect result would be attained.

Owing to the fact that in the present device the cutting members are in helical form and two cutting members are used with bearing portions in both cutting members oppositely disposed and extending the entire length of the work, it is absolutely impossible for the work to get out of alinement while being operated upon by the tool.

The flattened portions 17 provide spaces which will take care of the chips as the work is being finished, each such space providing a place in which the chips cut by sector of cutting member in advance of said portion 17 may find lodgment.

In the operation of the tool, a hole is drilled into the work large enough to receive the end 11 and then the broach 10 is drawn through the same, the two cutting members 13, 14, cutting away the roughened surface of the hole until the required diameter is obtained.

The continued movement of the broach 10 through the work will cause the unbroken helices 16 of the cutting members 13, 14, and the annular cutting members 15 to remove any burs which there may be on the wall of the hole in the work.

When the end 12 is drawn through the work, the entire surface of the hole is burnished and in condition to receive a shaft or other member to be disposed therein.

It is believed that the operation and many advantages of the invention will be readily understood without further description.

Having thus described my invention, I claim—

1. A device of the class described consisting of a member having a cylindrical portion at one end and a helical cutting member extending therefrom toward the other end and gradually increasing in diameter, said cutting member having flattened portions at intervals.

2. A device of the class described consisting of a member having a cylindrical portion at one end and a helical cutting member extending therefrom toward the other end and gradually increasing in diameter, said cutting member having flattened portions at intervals and in overlapping relation to each other.

3. A device of the class described consisting of a member having a cylindrical portion at one end, a helical cutting member extending therefrom toward the other end and gradually increasing in diameter, and a plurality of annular members at said other end of the same diameter as the larger diameter of said helical member.

4. A device of the class described consisting of a member having a cylindrical portion at one end, a helical cutting member extending therefrom toward the other end and gradually increasing in diameter, and a plurality of annular members at said other end of the same diameter as the larger diameter of said helical member, said helical member having flattened portions at intervals.

5. A device of the class described consisting of a member having a cylindrical portion at one end, a helical cutting member extending therefrom toward the other end and gradually increasing in diameter, and a plurality of annular members at said other end of the same diameter as the larger diameter of said helical member, said helical member having flattened portions at intervals for the greater part of its length with a plurality of continuous unbroken helices at said other end.

6. A device of the class described consisting of a member having a cylindrical portion at one end, a helical cutting member extending therefrom toward the other end and gradually increasing in diameter, and a plurality of annular members at said other end of the same diameter as the larger diameter of said helical member, said helical member having flattened portions in overlapping relation to each other at intervals for the greater part of its length with a plurality of continuous unbroken helices at said other end.

7. A device of the class described consisting of a member having a cylindrical portion at one end and two helical cutting members extending therefrom toward the other end and gradually increasing in diameter, said cutting members having flattened portions at intervals those of one member substantially perpendicular to those of the other member.

8. A device of the class described consisting of a member having a cylindrical portion at one end and a helical cutting member extending therefrom toward the other end and gradually increasing in diameter, the various helices being provided at intervals with flattened portions of such a width that if in the same plane their adjacent ends would intersect the cutting edge at short distances apart.

9. A device of the class described consisting of a member having a cylindrical portion at one end and two helical cutting members extending therefrom toward the other end and gradually increasing in diameter said cutting member being provided with flattened portions at right angles to each other and of such a width that if in the same plane the adjacent ends thereof would intersect the cutting edges at short distances apart.

Signed by me at 4 Post Office Square, Boston, Mass., this 24th day of June, 1919.

FRANCIS J. LAPOINTE.

Witnesses:
 WALTER E. LOMBARD,
 NATHAN C. LOMBARD.